Nov. 16, 1965  M. M. COOK  3,217,979
APPARATUS FOR CENTRIFUGALLY SEPARATING HONEY AND WAX
Filed Feb. 9, 1962  4 Sheets-Sheet 1

Maxwell M. Cook
INVENTOR.

Maxwell M. Cook
INVENTOR.

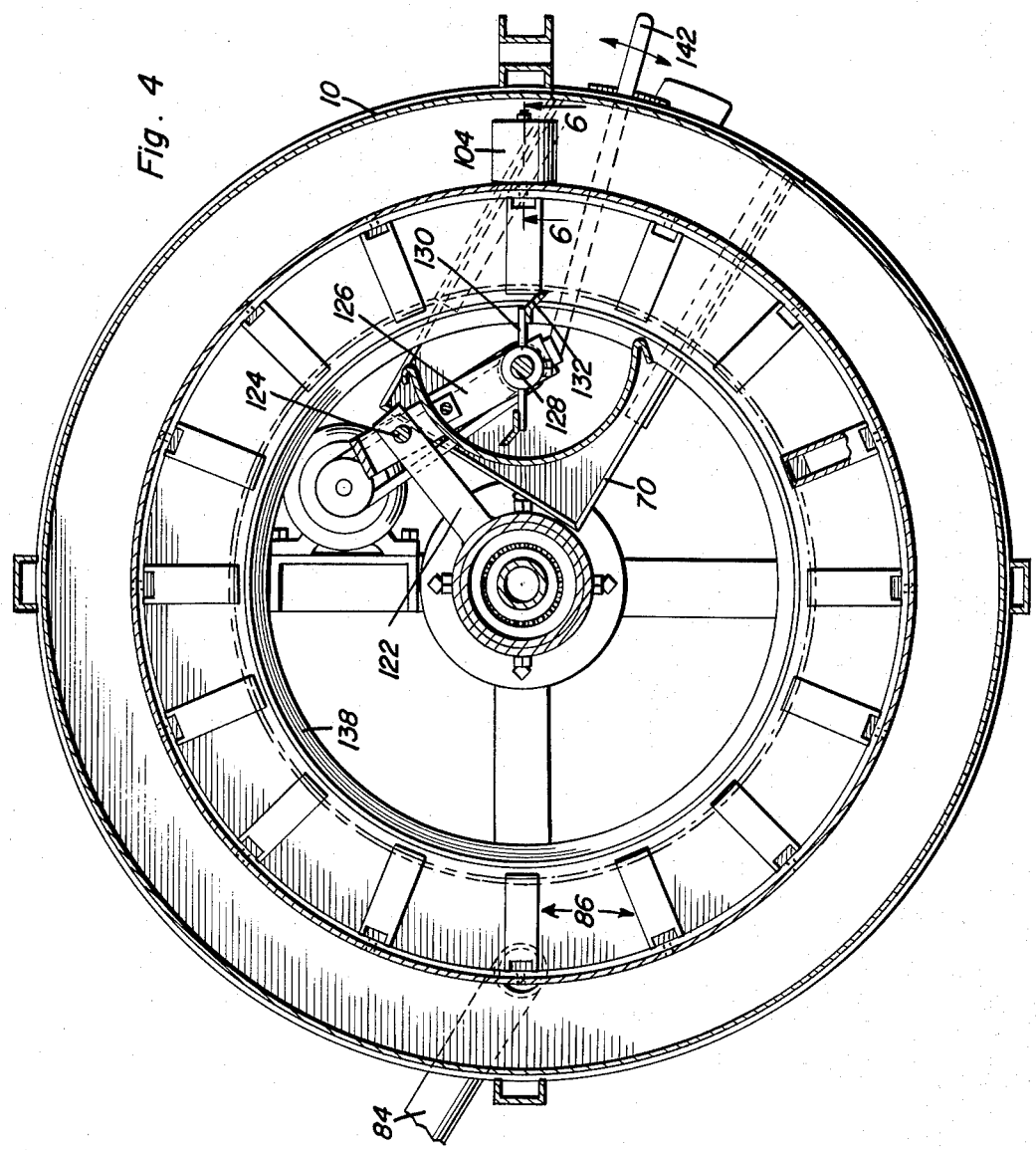

Nov. 16, 1965  M. M. COOK  3,217,979
APPARATUS FOR CENTRIFUGALLY SEPARATING HONEY AND WAX
Filed Feb. 9, 1962  4 Sheets-Sheet 4
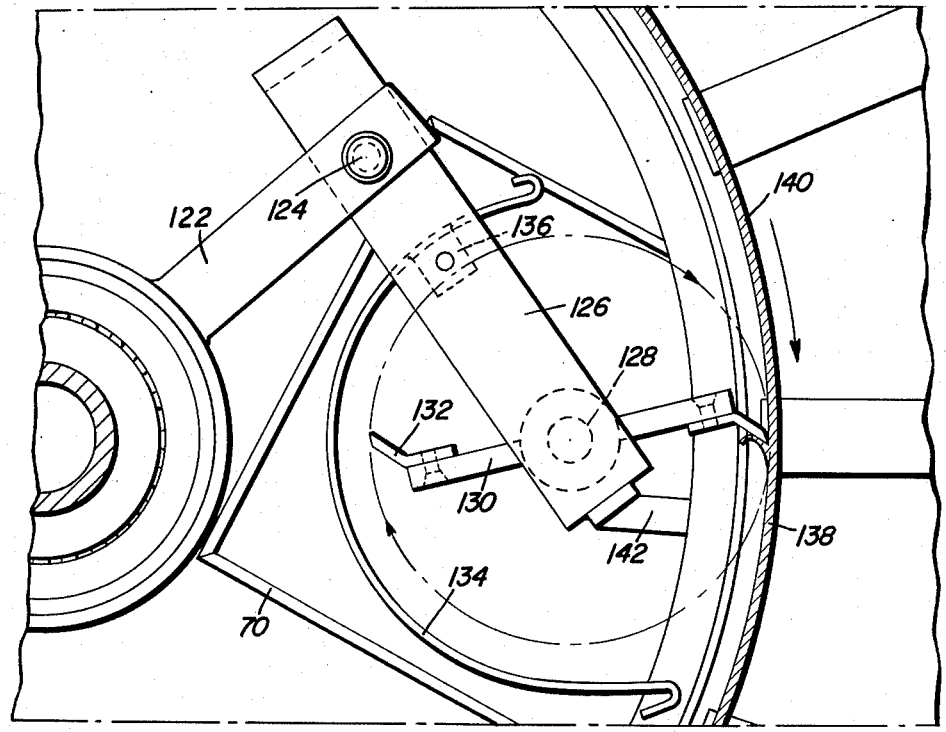
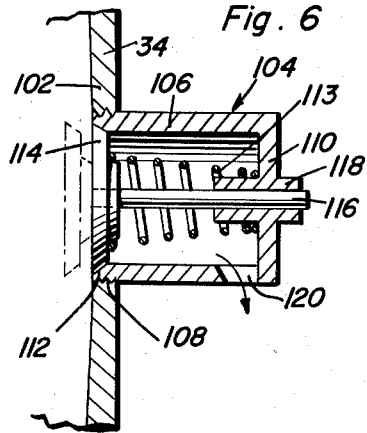
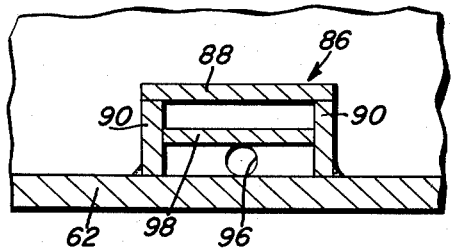
Maxwell M. Cook
INVENTOR.

United States Patent Office 3,217,979
Patented Nov. 16, 1965

3,217,979
APPARATUS FOR CENTRIFUGALLY
SEPARATING HONEY AND WAX
Maxwell M. Cook, Box 535, Loup City, Nebr.
Filed Feb. 9, 1962, Ser. No. 172,150
5 Claims. (Cl. 233—7)

This invention comprises a novel and useful method and apparatus for centrifugally separating honey and wax and more specifically pertains to providing an apparatus and a process enabling a highly efficient continuous separation of pure honey from the wax particles in a mixture of honey and wax cappings from the honeycomb.

In the industry of producing honey upon a commercial scale it is the present practice to remove the wax caps from the honey cells of the wax honeycomb, then drain or otherwise extract the honey from the honeycomb cells and collect the extracted honey with the wax cappings mixed therewith. In order to produce honey with a satisfactory degree of purity from the wax, it is desirable to remove as completely as possible the wax of the wax cappings from the liquid honey and to effect this separation without damage to the quality of the honey and with a minimum requirement of time, labor and equipment.

Heretofore, there have been two general methods available in the industry to accomplish the removal or separation of the cappings from the honey. The most generally employed method is that of permitting the mixed honey and wax cappings to stand until most of the cappings float, where they are then removed from the gravity separated honey by screening. The residual honey of either the separated honey or the wax cappings is then heated to a considerable temperature which melts the remaining wax, thereby causing it to separate and float upon the top of the honey, where it is then removed by various mechanical means. This process is time consuming because of the relatively long period of time required for gravity separation to occur to any practical extent and the quality of the clear honey thus extracted is decreased by the temperatures to which it is subjected during the heating process for melting the wax.

A second method which is known to the industry involves the use of a revolving drum having perforated or screened sides. With the mixed honey and wax cappings placed therein, centrifugal force is relied upon to force the honey to and through the perforated sides and screens leaving the wax cappings within the drum. This method, from a practical standpoint, is relatively unsatisfactory and is now little used because the screens or perforations of the sides tend to quickly become clogged by wax therein so that no continuous flow is possible and the machine must be repeatedly stopped to remove the cappings and scrape the wax encrustations from the screen openings.

It is therefore the primary purpose to provide an apparatus and a method which will satisfactorily overcome the difficulties heretofore encountered in separating honey from wax cappings mixed therewith.

A further object of the invention is to provide an apparatus and a method which will enable a relatively complete and highly efficient separation of honey from the wax cappings mixed therewith in a relatively short period of time, with a minimum amount of labor and attention being required, and wherein the process of separation may be performed as a continuous process rather than as a batch method.

Still another object of the invention is to provide an apparatus and a method whereby centrifugal force is effectively utilized to effect an initial separation of the honey from the wax of the wax cappings; is utilized to accumulate the wax cappings into an annular wall forming a part of the confining chamber for the mixture of wax cappings and honey undergoing treatment; is utilized to effect a progressive movement or feeding of this annular wall towards the axis of rotation so that wax may be removed from one side of the wall at a rate proportionate to the accumulation of wax deposits on the other side of the wall to thereby maintain a substantially uniform thickness of the wax wall; to maintain the wax wall and the individual wax particles thereof in position for a sufficient period of time for centrifugal force to effect a further and very complete separation of the honey from the interstices of the wax particles of the wall; to effect an introduction of and distribution of the supply of mixed honey and wax uniformly about the periphery of the centrifuging chamber of the apparatus; to effect a substantially continuous discharge of the substantially pure separated honey from the centrifuging chamber of the apparatus; and to automatically dump or discharge the contents of the centrifuging chamber whenever the speed of rotation of the latter drops below a predetermined rate.

A further important object of the invention is to provide an improved apparatus of a relatively simple and compact character for effectively separating by centrifugal action wax from the honey in a mixture of wax cappings and honey.

A further object of the invention is to provide an apparatus in conformity with the aforementioned objects which collect the separated wax into a discrete body and maintain that body in the apparatus and under the effect of centrifugal force to extract as completely as possible any residual honey retained in the interstices of the wax particles of the wax body.

Yet another purpose of the invention is to provide an apparatus in accordance with the foregoing objects wherein the separated wax is collected into a discrete body, with the wax material of the body being continuously removed therefrom after a predetermined interval of time while additional wax is deposited upon the body in a continuous manner.

A further object of the invention is to provide a device in accordance with the preceding objects wherein a rotary cutter is provided for continuously removing wax from a discrete body of collected wax segregated from the mixed wax cappings and honey and wherein the position of the rotary cutter may be adjusted in order to control the thickness of the body of the accumulated wax.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a horizontal sectional view through the apparatus taken substantially upon the plane indicated by the section line 4—4 of FIGURE 3, with certain concealed parts being shown in dotted lines therein;

FIGURE 5 is an enlarged detail view of a portion of FIGURE 4 and showing more clearly the construction and operation of the rotary cutter for removing accumulated wax from the apparatus;

FIGURE 6 is a detail view in vertical transverse section taken substantially upon the plane indicated by section line 6—6 of FIGURE 4 and showing an automatically operated centrifugal unloading valve means for the centrifuge chamber of the apparatus;

FIGURE 7 is a further detail view in vertical transverse section taken substantially upon the plane indicated by the section line 7—7 of FIGURE 3 and showing a portion of the passage means for discharging pure honey from the apparatus.

The basic principles of the apparatus in accordance with this invention consists in the provision of a generally cylindrical centrifuging casing revolvable about a vertical axis with means for introducing a mixture of honey and wax cappings in the upper end of the casing in a continuous manner and honey outlet means for removing pure honey in a continuous manner from the lower side of the casing. Centrifugal action is relied upon to cause an initial separation of the honey from the wax cappings with the honey collecting in a pool at the periphery of the casing and with the wax being displaced towards the axis of rotation and accumulating in an annular wall which with the circumferential wall and the bottom wall of the casing serves to confine the mixture of wax and cappings. This wall is maintained in position throughout the operation of the machine and the wax particles in the wall are retained therein for a sufficient length of time to enable centrifugal force to effectively separate or extract or expel wax from between the interstices of the wax particles so that substantially all of this residual honey may be effectively reclaimed and recovered. The wall is maintained by balancing the rate of addition of wax to the outer periphery of the wall with the rate of removing wax from the inner periphery of the wall with the wall being continuously pressed and displaced radially inwardly by the centrifugal force applied to the mixture of wax and honey in the chamber.

The principles of the invention further include the removal of the wax in a continuous manner by a rotary cutter disposed radially inwardly of the casing and the annular wax wall together with means for adjustably moving the cutter towards or from the axis of rotation to thereby arbitrarily vary the otherwise uniform thickness of the wax wall maintained thereby. Provision is made for automatically opening a dumping valve in the casing to discharge the liquid or fluid contents thereof whenever the speed of rotation of the casing decrease below a predetermined value, as for example when the operation of the machine is to be stopped. Finally, the wax cuttings removed from the accumulated wax wall are discharged through the axial interior of the apparatus to a suitable wax collection and disposal means.

Figure 1:
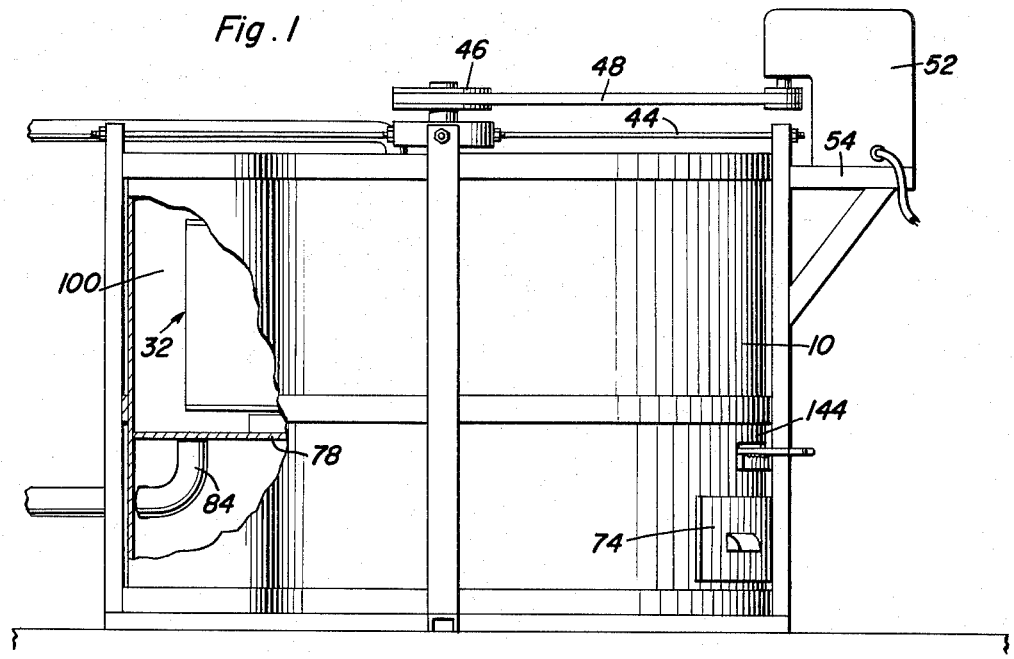
FIGURE 1 is a side elevational view of a preferred form of apparatus in accordance with this invention, parts being broken away to show certain details of the internal structure of the device.
Figure 3:
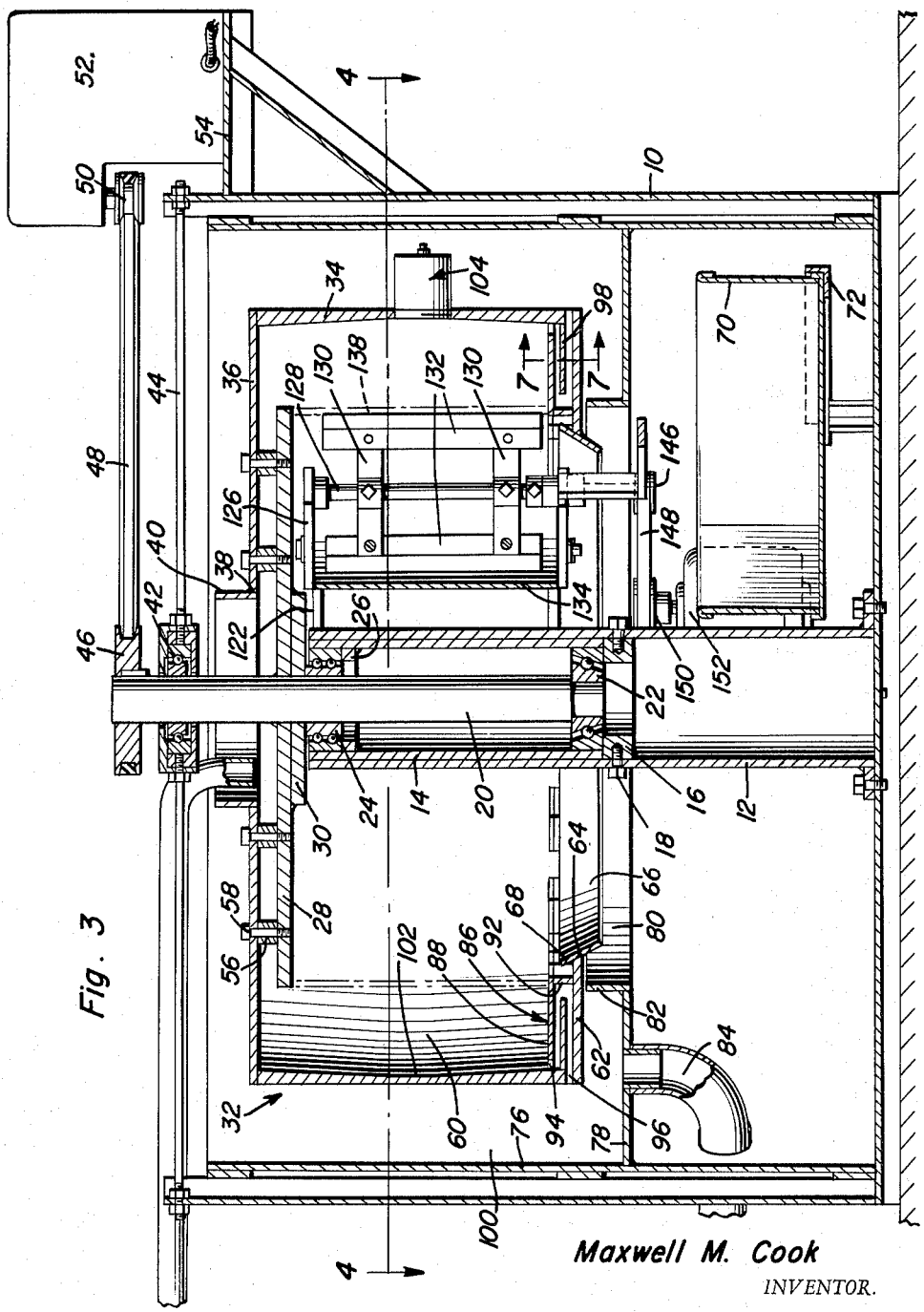
FIGURE 3 is a vertical transverse sectional view taken substantially upon the plane indicated by the section line 3—3 of FIGURE 2 and showing upon an enlarged scale the internal arrangement of the apparatus.

In the accompanying drawings reference is made first primarily to FIGURES 1 and 3 wherein there is disclosed an exemplary form of apparatus for carrying out the principles of this invention. The apparatus includes any suitable stationary enclosing means such as the cylindrical housing 10 in which is mounted a stationary hollow cylindrical standard in the form of a tube 12. Removably received in the upper end of this tube or standard 12 is a sleeve 14 which at its lower end rests upon a supporting collar 16 removably retained in place in the standard as by fasteners 18. The sleeve 14 has journaled therein a revolvable shaft 20 whose lower end is provided with a thrust bearing assembly 22 resting upon the collar 16 and its upper end is provided with a bearing assembly 24 retained and supported in the sleeve as by resting upon an internal ring or rib 26. The shaft 20 extends upwardly above the open coterminous upper ends of the sleeve and standard and has fixedly mounted thereon as by welding or the like a disk or plate 28 which constitutes a baffle or distributing plate as set forth hereinafter together with a further reinforcing plate 30 disposed therebeneath and secured thereto.

A centrifuge in the form of a rotatable casing indicated generally by the numeral 32 is disposed within the enclosure 10 and mounted upon the shaft for rotation therewith. This casing consists of a generally cylindrical circumferentially extending peripheral wall 34 having at its upper end a top wall 36 secured thereto. This top wall has an axial opening 38 surrounding the shaft 20 and is provided with an upstanding sleeve 40 comprising or defining an inlet means by which a mixture of honey and wax cappings from any suitable source may be introduced into the casing in any desired manner.

In order to journal the upper end of the shaft 20, there is provided a journal bearing assembly 42 which is secured by various radially extending members 44 to the framework of the enclosing housing 10.

Power is applied to the shaft 20 for effecting rotation of the latter and of the centrifuge casing 32 by means of a pulley 46 secured to the upper extremity of the shaft and connected as by a belt 48 or other suitable drive connection with the driving pulley 50 of a source of power such as an electric motor or the like 52, the latter being conveniently mounted upon a suitable supporting bracket or shelf 54 secured to and carried by the supporting framework of the enclosure 10.

Although the invention is not limited thereto it is particularly desirable that the source of power 52 shall be capable of operation at varying speeds under any suitable control means, not shown, in order that accurately determined speeds of rotation may be imparted to the shaft 20.

As previously mentioned, the centrifuge casing 32 has its peripheral wall 34 provided with a top wall 36 which may be removable therefrom. In addition, this top wall by means of tubular spacer bushings 56 and fasteners 58 is mounted upon and supported in spaced relation above the baffle plate 28. The latter has its periphery terminating in spaced relation to the peripheral wall 34 so as to provide an annular space therebetween which constitutes an inlet opening into the annular or cylindrical centrifuge chamber 60 of the interior of the casing. It will be understood that the interior of the casing or centrifuge chamber 60 opens radially inwardly to the standard 12 insofar as structure is concerned. The casing is completed by a bottom wall 62 secured to the edge of the peripheral wall 34 at the bottom side thereof, this bottom wall having a relatively large central opening 64 therethrough in which is mounted a frusto-conical or funnel-shaped skirt or sleeve 66 which projects inwardly and upwardly into the casing to provide an upwardly projecting annular rim 68 therein for a purpose to be subsequently set forth. The open interior of the skirt or sleeve 66 constitutes a discharge means for the interior of the centrifuge chamber 60 by means of which separated wax is eventually discharged downwardly under the influence of gravity in a manner to be subsequently set forth into a collection pan or tank 70 mounted as upon a suitable support bracket structure 72 and which may be removed as through an access opening having a closure 74 as suggested in FIGURE 1. Alternatively, a conveyor or other means may be provided for automatically and continuously or intermittently as desired removing the separated and collected wax from the apparatus.

A cylindrical wall 76 is secured to the interior of the enclosing means 10, preferably in fixed relation thereto and surrounds and encloses the centrifuging casing 32. This wall is provided with a bottom wall 78 having a central opening 80 therein provided with an upturned cylindrical rim or sleeve 82. As will be noted from FIGURE 3, the discharge sleeve 66 opens into the opening 80 within the rim 82. The walls 76, 78 and 82 comprise a collection space or collection chamber for the accumulation thereinto of separated honey as discharged from the centrifuging chamber as set forth hereinafter, this honey being removed as by a discharge conduit 84 opening through the bottom wall 78 and discharging to the exterior of the enclosing structure 10.

Figure 2:
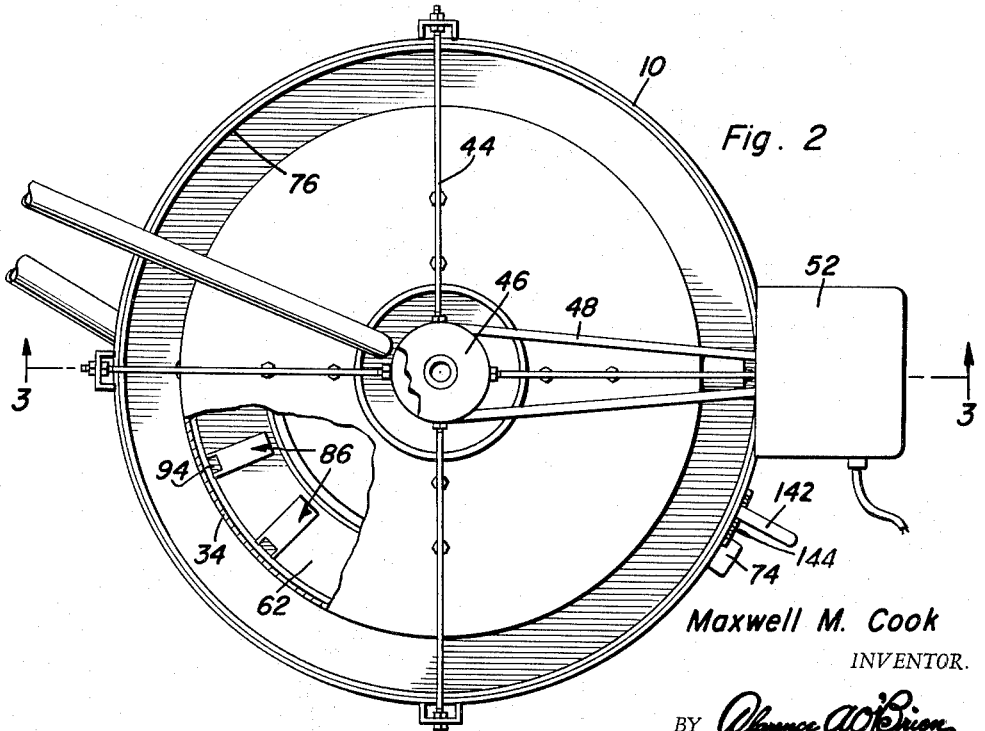
FIGURE 2 is a top plan view of the arrangement of FIGURE 1, a portion being broken away and shown in horizontal section.

Means are provided for continuously removing the separated pure honey from the pool of the latter collected by centrifugal force adjacent the peripheral wall 34. This honey removal means consists of a plurality of passage means each designated generally by the numeral 86, these passage means being disposed radially of the bottom wall 62 of the centrifuge casing 32 as shown best in FIGURES 2 and 4. As will be apparent from a consideration of FIGURE 7 in conjunction with FIGURE 3, the honey removing means or discharge means 86 comprises a generally rectangular shaped housing consisting of a top wall 88 which closes the upper ends of a pair of side walls 90 and a radial inner wall 92. The top wall 88 is provided with an opening or openings 94 disposed immediately adjacent to the peripheral wall 34, and there is a discharge opening in the form of a port or passage 96 disposed through the peripheral wall 34 immediately adjacent the casing bottom wall 62. A separator or partition in the form of a plate 98 is disposed within each of the passage means, being disposed parallel to the walls 88 and 62 and is secured to the side walls 90 and to the peripheral wall 34 but terminates in spaced relation to the inner end wall 92. The spacing between the plates 88, 98 and 62 is very restricted so as to permit a slow flow of pure honey therethrough while preventing the egress of wax or honey mixed with wax.

In operation, the pure liquid honey accumulating in a pool of cylindrical or annular configuration adjacent the peripheral wall 34 is free to pass downwardly under the influence of gravity through the opening 94, then across the top of the divider plate 98, then down through the opening adjacent the wall 92, then between the divider plate and the bottom wall 62 and through the discharge opening 96. From thence the honey is collected in the collection chamber or basin, designated generally by the numeral 100 and which surrounds the centrifuging casing 32, the honey being removed from time to time as desired from the collection basin by the conduit 84 and any suitable control means therefor, not shown.

A supply of honey mixed with wax cappings is introduced either intermittently or continuously through the inlet means of the centrifuge casing by means of the opening through the sleeve 40 then upon the baffle plate 28, being discharged centrifugally from the periphery of the same through the annular inner opening into the centrifuge chamber 60.

It will be appreciated that the rate of inlet of the mixture of wax cappings and honey will be properly adjusted, by any suitable means, not shown, in accordance with the rate of separation of the honey from the wax in the apparatus so as to maintain the apparatus at all times substantially filled at a level which is below the top of the standard and sleeve 12 and 14 so as to prevent possible overflow thereinto.

A further important feature of the invention resides in the provision of automatic dumping or unloading valve for discharging liquid from the interior of the centrifuge chamber when the speed of rotation of the centrifuge casing decreases below a predetermined value. For this purpose the inner surface of the peripheral wall 34 is inclined or sloped axially inwardly and radially outwardly from its marginal edges towards a selected region which is preferably the medial area thereof to provide a circumferentially extending sump 102. Opening from this sump is an automatic centrifugally operated unloading valve indicated generally by the numeral 104. This valve may be of many suitable constructions and it is to be understood that the principles of the invention as disclosed and claimed herein are not limited to any particular construction of valve for this purpose. FIGURE 6, however, shows a satisfactory simplified construction of an unloading valve for the purpose of this invention.

As illustrated therein, the valve simply comprises a cylindrical casing 106 having its open externally threaded end secured in an internally threaded opening 108 in the peripheral wall 34, and having a closed outer end wall 110. The open inner wall of the cylindrical casing 106 is provided with a valve seat 112 which is engaged by a valve 114 of the well known poppet valve type, this valve having a valve stem 116 which is guidingly received in a guide bushing 118 formed in the end wall 110, and which is yieldingly urged to open position by a compression spring 113 disposed between the end wall 110 and the head of the valve 114. The casing is provided at its bottom surface with a discharge port 120 which discharges into the collection basin 100 previously mentioned.

When the centrifuge casing 32 is rotating at the desired operating speed, centrifugal force will maintain the valve 114 closed against the seat 112 thus preventing any escape of liquid from the interior of the centrifuge chamber 60. However, when this rotational speed drops below a predetermined rate, as when the device is to be shut down for any purpose, the spring will open the valve and during this decreased rate of rotation will enable centrifugal force to discharge the liquid contents of the centrifuge chamber 60 through this valve into the collection basin. Thus, the device is self-clearing in its operation completely emptying itself automatically. This overcomes a serious difficulty encountered in prior art constructions which necessitate laborious treatments for cleansing the device after its period of use. Further, in order to sterilize or otherwise further clean the interior of the device, steam or other cleaning agent may be introduced through the inlet opening 40, may be cleansingly passed through the device by rotation of the centrifuge casing 32 at any desired rate of speed and discharged therefrom by the automatic unloading valve as above mentioned.

During the operation of the device it is to be understood that centrifugal action retains the mass of mixed honey and wax cappings in a cylindrical layer or strata which lies adjacent to the end wall 34. Centrifugal force further separates by virtue of their different specific gravities the pure honey in a pool immediately adjacent to the peripheral wall 34 and the wax particles into a discrete separate body or accumulation which builds up into an annular wall concentric with the axis of rotation. Thus, this annular wall in cooperation with the bottom wall 62 and the peripheral wall 34 provides a cylindrical chamber in which the liquid component of the mixture is maintained. The accumulation of the wax into this annular wall is inherent with this form of apparatus and performs several important functions. First, it provides an inner wall for the mass of wax cappings and honey being centrifuged; second, it prevents overflow or escape of the liquid portion of the mixture through the central openings of the members 68 and 82; third, it maintains the wax accumulation under the influence of centrifugal action for a sufficient period of time in order to effect by centrifugal action the substantially complete extraction of honey from the interstices of the wax particles of this wax accumulation in the wall.

During the operation of the device separated wax is being continually added in the form of a deposit upon the outer or convex portion of the wax thereby displacing the wall inwardly under the pressure of centrifugal action upon the honey in the pool within the device. In order to maintain this wall at a uniform thickness, and to limit the travel of the wax particles from the outer to the inner face of the wall by this continuing depositing of wax upon the outer wall face, means are provided for scraping or cutting and removing wax continuously from the inner face of this wall. For this purpose there is provided a power operated rotary cutter means of a construction to be now described.

Fixedly secured to and projecting laterally from the standard 12 adjacent the upper end of the same is an upper support arm 122. Pivotally secured to the outer extremity of this arm as by a pivot 124 is a horizontally extending support lever 126. Journaled in the outer extremity of the lever 126 is the upper end of a vertical shaft 128. Secured to the shaft are upper and lower sets of diametrically extending transverse support arms 130 and secured to the outer ends of these arms are vertically extending cutter blades or knives 132. In a similar manner, the lower end of the shaft 128 is supported. An arcuate guard or shield 134 is supported by the upper and lower sets of fixed support arms 126 as by suitable brackets 136, to form a shield surrounding the rotating knives so that the cuttings removed thereby may drop vertically downward through this shield into the collection receptacle 70 after passing through the discharge openings in the members 68 and 82.

As will be noted from FIGURE 3, the lower end of the knives 132 extend just above the top surface of the member 88 of the honey discharge means 86 and closely adjacent thereto. The arrangement is such that during the rotation of the rotary cutter, the knives 132 will, as shown in FIGURE 5, scrape away the inside wall of the annular wall of deposited accumulated wax 138 thus maintaining this annular wall at any desired thickness as indicated at 140. Thus, as the wax accumulates it is progressively displaced radially inwardly of the centrifuge chamber by the centrifugal pressure exerted thereon of the liquid honey, the inner face of this wall is being continuously shaved away and these shavings in the form of granules and flakes drop into the collection basin 70 as previously mentioned.

It will be appreciated that by properly regulating the speed of operation of the rotary cutter, that the rate of removal of wax can be adjusted to correspond to the rate of depositing of wax upon the opposite face of the wall to thus maintain a uniform thickness of wall. The time required for a particular layer of wax particles to migrate radially inwardly from their deposition on the outer face of the wall to the other face of the wall where they will be removed by the rotary cutter can be controlled through the previously mentioned variable factors in the operation of the machine to produce a desired time lag during which centrifugal force will effectively remove substantially all of the liquid honey which is held in the interstices of the wax particles of the accumulation in the wall. Thus a very complete recovery of honey from the wax cappings as well as a very effective separation of the honey from the wax cappings of the mixture is obtained by centrifugal force without necessitating heating the honey to melt the wax and without interrupting the continuous flow of a mixture of wax cappings and honey into the apparatus and the continuous discharge of separated wax and the separating of the honey therefrom.

It is desirable to effect adjustment of the cutting knives towards and from the wax wall in order to thereby control the width or thickness of the latter and thus the time required for a given particle of wax to be removed from the apparatus. In order to effect this adjustment, a manually operable adjusting lever 142 is provided extending through a suitable slot or opening as at 144 in the side wall of the enclosure 10 to the exterior thereof for manual operation. This adjusting lever is secured to the lower support lever 126 in order to enable the latter and the upper support lever with the rotary cutter shaft 128 carried thereby to be oscillated as a unit about the vertical axis of the pivot 124. This will result in moving the rotary cutter towards or from the annular wax wall in order to vary the intersection of the cutter blades' path of travel with the wax wall.

In order to impart rotation of the rotary cutter the shaft of the latter may be extended at its lower end to receive a drive pulley 146 which by a belt 148 is coupled to a pulley 150 which may be driven in any suitable manner. Preferably a separate source of power such as a motor 152 may be coupled to this pulley in order to independently control rotation of the rotary cutter thereby.

From the foregoing, it is believed that the operation of the apparatus will now be readily understood. The method of separating and recovering honey from a mixture of honey and wax cappings also forms an important feature of this invention. While this method may be performed by this particular apparatus hereinbefore described, it may also be performed by numerous other constructions of apparatuses. The method in accordance with this invention is as follows:

A mass of mixed honey and wax cappings is subjected to centrifugal force by being rotated about an axis of rotation and while being confined to a cylindrical path of travel. By centrifugal action, honey is initially separated from the associated wax cappings mingled therewith with the wax free honey accumulating in a pool adjacent to the cylindrical path of rotation and with the wax cappings being disposed radially inwardly towards the axis of rotation to form a discrete body of wax particles constituting an annular wall. The wall of separated wax thus produced is utilized in this method to assist in retaining the mixture of wax cappings and honey in the cylindrical zone of treatment.

The method further includes the step of progressively displacing this wax accumulation radially inwardly from the cylindrical zone towards the axis of rotation while continually depositing wax upon the convex face of this annular wall.

The method further includes the step of continually removing wax from the inner or concave face of the annular wall at a rate substantially equal to that at which wax is deposited upon the outer face of the wall so as to maintain the wall at a predetermined constant thickness, the removed wax being discarded.

A further important step of the method resides in maintaining this wall and in causing the migration of the wax from the deposited outer convex surface of the wall to the inner surface of the wall from which it is removed to occupy a sufficient length of time to enable centrifugal force to complete the separation of any honey remaining in the interstices of the wax particles of the wall.

Further, the method includes the step of intermittently or continuously introducing a mixture of wax cappings and honey into the centrifugal separating zone and continuously removing separated honey and wax from the latter.

Finally, the method includes the step of automatically discharging the honey and the mixture of honey and wax cappings from the centrifugal zone when the rate of rotation of the latter increases below a predetermined value.

The apparatus and the method of this invention thus provide a system whereby honey may be quickly removed from wax cappings in a manner which is unusually thorough and efficient in the recovery of the honey, which is very rapid in its operation, which may be conformed as a continuous uninterrupted process, and which produces a honey whose characteristics are not damaged by such heretofore necessary treatments as heating the honey and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A separator for intermingled honey and wax cappings comprising a casing have a circumferentially extending peripheral wall and mounted for rotation about its central vertical axis, inlet means for introducing wax cappings mixed with honey into said casing, means for rotating said casing at a speed sufficient to centrifugally separate the honey from the wax capping and to cause the wax free honey to accumulate adjacent but spaced from said peripheral wall and the wax capping to accumulate as an annular solid wax wall adjacent the axis of rotation, wax removing means maintaining said wax wall at a predetermined thickness by removing wax from the concave surface of said annular wall, outlet means for removing wax free honey from said casing adjacent said peripheral wall, an outer housing having a bottom wall with an opening disposed centrally thereof, said casing having a bottom wall with a centrally disposed opening registering with said housing bottom wall opening, a standard mounted on said housing and extending through both of said openings into said casing, means journaling said casing upon said standard, said wax removing means comprising a rotary cutter blade assembly, arms projecting laterally from said standard into said casing and journaling said cutter blade assembly for rotation about an axis which is displaced from that of said casing, means independent of said casing rotating means for causing rotation of said cutter blade assembly, said cutter blade assembly including vertically extending blades positioned to engage said wax wall from the lower edge thereof upwardly along the full length of said blades.

2. The combination of claim 1 wherein said arms include an upper set of arms adjacent the top of said casing and a lower set of arms disposed below said casing bottom wall, adjusting means on said arms supporting said carrier and effecting swinging movement of said carriers, its axis of rotation and its blades towards and from said wax wall.

3. The combination of claim 1 including wax receiving means in said housing below said housing bottom wall opening for receiving wax removed from said wax wall by said cutter blade assembly.

4. The combination of claim 3 including upstanding rims about each of said bottom wall openings with the rim of the casing bottom wall opening having a downwardly projecting portion extending into said housing bottom wall rim and discharging therethrough and into said receiving means wax removed from said wax wall by said rotary cutter blade assembly.

5. The combination of claim 1 wherein said housing bottom wall has an upstanding rim about said housing bottom wall opening, said rim and the outer wall and bottom wall of said housing constituting a honey collecting chamber, said means for removing wax free honey discharging into said housing collecting chamber.

References Cited by the Examiner
UNITED STATES PATENTS

| | | | |
|---|---|---|---|
| 238,536 | 3/1881 | Shaw | 210—374 |
| 503,731 | 8/1893 | Anderson | 233—10 |
| 528,681 | 11/1894 | Ohlsson | 233—3 |
| 957,715 | 5/1910 | Roberts et al. | 233—10 X |
| 1,483,484 | 2/1924 | Rubert | 233—20 |
| 1,564,665 | 12/1925 | Gates | 233—7 |
| 2,370,999 | 3/1945 | Schutte | 210—78 |
| 2,443,310 | 5/1948 | Eckers | 233—10 X |
| 2,692,832 | 10/1954 | Hensgen | 233—10 X |
| 2,844,253 | 7/1958 | Everett | 210—77 X |
| 2,873,064 | 2/1959 | Diefenbach | 233—10 |

FOREIGN PATENTS

| | | |
|---|---|---|
| 789,489 | 8/1935 | France. |
| 469,338 | 7/1937 | Great Britain. |
| 738,825 | 10/1955 | Great Britain. |

M. CARY NELSON, *Primary Examiner.*

ROBERT F. BURNETT, *Examiner.*